United States Patent
Sperber et al.

(10) Patent No.: US 7,167,989 B2
(45) Date of Patent: Jan. 23, 2007

(54) PROCESSOR AND METHODS TO REDUCE POWER CONSUMPTION OF PROCESSOR COMPONENTS

(75) Inventors: Zeev Sperber, Zichron Yaakov (IL); Ittai Anati, Haifa (IL); Ofer Sierra, Zichron Yaakov (IL); Asi Joseph, Kiryat Motzkin (IL); Sagi Lahav, Kiryat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 500 days.

(21) Appl. No.: 10/682,892

(22) Filed: Oct. 14, 2003

(65) Prior Publication Data

US 2005/0081067 A1   Apr. 14, 2005

(51) Int. Cl.
*G06F 9/00* (2006.01)

(52) U.S. Cl. .............. 713/310; 713/300; 700/291; 712/220

(58) Field of Classification Search .............. None
See application file for complete search history.

(56) References Cited

U.S. PATENT DOCUMENTS

| | | | | |
|---|---|---|---|---|
| 5,519,864 A | * | 5/1996 | Martell et al. | 712/215 |
| 5,867,683 A | * | 2/1999 | Witt et al. | 712/218 |
| 6,182,238 B1 | * | 1/2001 | Cooper | 710/266 |
| 6,845,432 B2 | * | 1/2005 | Maiyuran et al. | 711/154 |
| 6,931,559 B2 | * | 8/2005 | Burns et al. | 710/18 |

* cited by examiner

*Primary Examiner*—James K. Trujillo
*Assistant Examiner*—Anand B. Patel
(74) *Attorney, Agent, or Firm*—Pearl Cohen Zedek; Latzer, LLP

(57) ABSTRACT

Periods of futile activity by one or more logic circuits of a component of a processor may be predicted, and then during each such period, one or more of the logic circuits may operate in a power-save state with reduced power consumption, with the latter part of the period being used to bring the logic circuits back into performance state, so that performance is not diminished beyond an acceptable level due to the power-save state. The decision of whether to reduce the power consumption of a particular logic circuit of a particular processor component is to have at a particular future time is made internally in the particular processor component based on one or more signals received by the particular processor component.

21 Claims, 4 Drawing Sheets

PROCESSOR AND METHODS TO REDUCE POWER CONSUMPTION OF PROCESSOR COMPONENTS

BACKGROUND OF THE INVENTION

Computer designs may be directed to save energy. In particular, in portable devices the length of the battery life is of importance. One area in which a designer may deal with power saving is the operation of the processor core.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail for clarity.

According to some embodiments of the invention, periods of futile activity by one or more components of a processor may be predicted, and then during at least a portion of each such period, the component may operate in a power-save state, with the latter part of the period being used to bring the component back into performance state. In the power-save state, the power consumption of the component is reduced relative to the power consumption of the component in performance state.

In general, several conditions may need to be satisfied before the component is taken into power-save state. Similarly, recovery from power-save state to performance state may involve several stages.

In some embodiments of the invention, the conditions and stages may be designed so that the transition into and recovery from power-save state are substantially transparent and do not adversely affect the performance of the processor or of the apparatus in which the processor is installed beyond an acceptable level.

Embodiments of the invention will be described for particular examples of processor components. Then embodiments of the invention will be described for a general processor component.

Embodiments of the invention may be used in any apparatus having a processor. For example, the apparatus may be a portable device that may be powered by a battery. A non-exhaustive list of examples of such portable devices includes laptop and notebook computers, mobile telephones, personal digital assistants (PDA), and the like. Alternatively, the apparatus may be a non-portable device, such as, for example, a desktop computer or a server computer.

Figure 1:
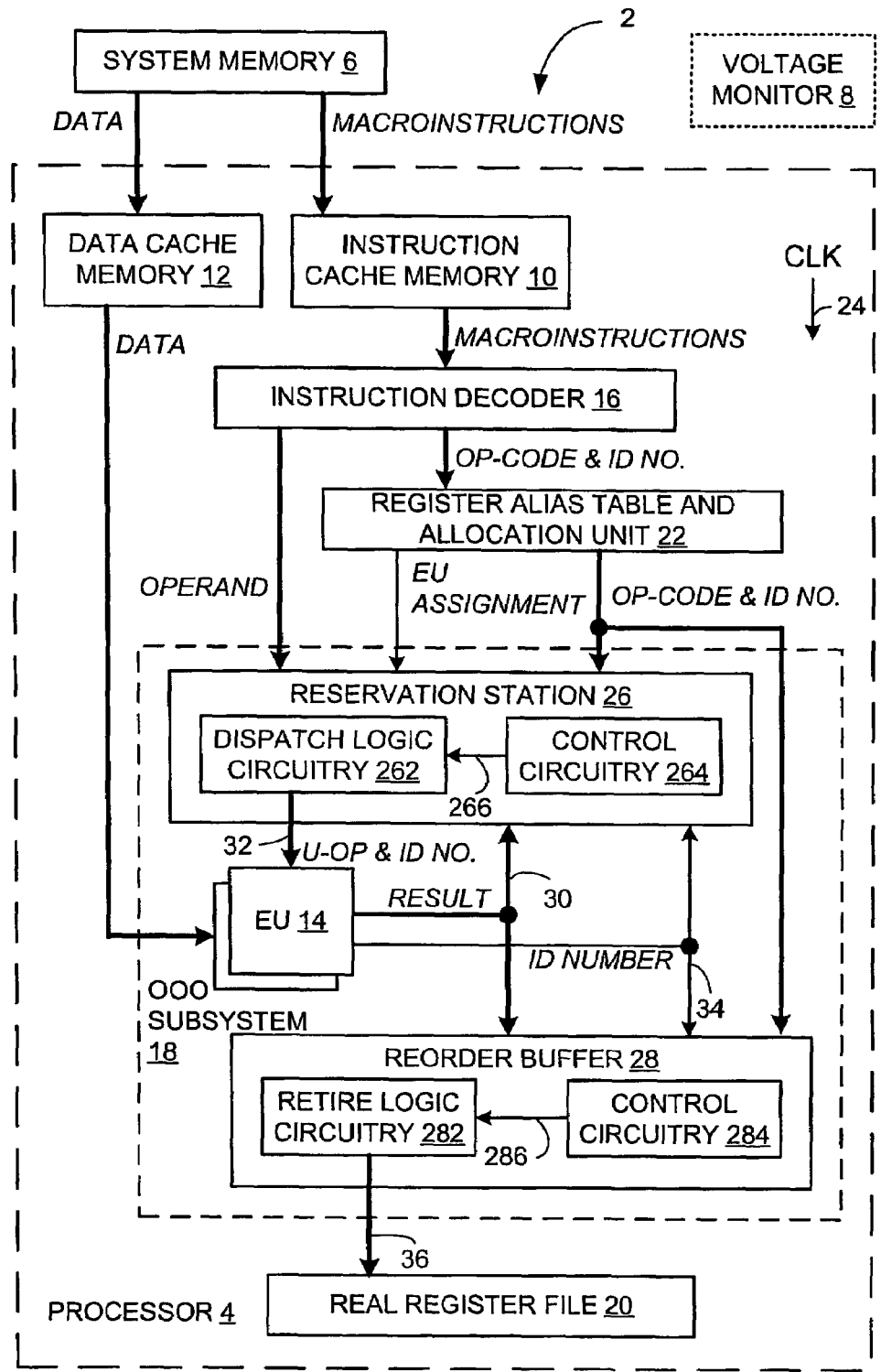
FIG. 1 is a block diagram of an apparatus having a processor according to an embodiment of the invention, the processor having an out-of-order subsystem that has a reservation station and a reorder buffer.

As shown in FIG. 1, an apparatus 2 may include a processor 4 and a system memory 6, and may optionally include a voltage monitor 8. Well-known components and circuits of apparatus 2 and of processor 4 are not shown in FIG. 1 for clarity.

Design considerations, such as, but not limited to, processor performance, cost and power consumption, may result in a particular processor design, and it should be understood that the design of processor 4 shown in FIG. 1 is merely an example and that embodiments of the invention are applicable to other processor designs as well. A non-exhaustive list of examples for processor 4 includes a central processing unit (CPU), a digital signal processor (DSP), a reduced instruction set computer (RISC), a complex instruction set computer (CISC) and the like. Moreover, processor 4 may be part of an application specific integrated circuit (ASIC) or may be part of an application specific standard product (ASSP).

A non-exhaustive list of examples for system memory 6 includes a dynamic random access memory (DRAM), a synchronous dynamic random access memory (SDRAM), a flash memory, a double data rate (DDR) memory, RAMBUS dynamic random access memory (RDRAM) and the like. Moreover, system memory 6 may be part of an application specific integrated circuit (ASIC) or may be part of an application specific standard product (ASSP).

System memory 6 may store macroinstructions to be executed by processor 4. Macroinstructions retrieved from system memory 6 may be stored temporarily in an instruction cache memory 10 of processor 4. System memory 6 may also store data for the macroinstructions, or the data may be stored elsewhere. Data for the macroinstructions retrieved from system memory 6 or elsewhere may be stored temporarily in a data cache memory 12 of processor 4.

A processor having more than one execution unit (EU) 14 may employ out-of-order techniques in order to use the execution units in an efficient manner. An instruction decoder 16 may decode a macroinstruction into one or more micro-operations ("u-ops") depending on the type of macroinstruction or according to some other criterion. Instruction decoder 16 may assign a unique identification number to each u-op. Each u-op may be executed by an out-of-order (OOO) subsystem 18 of the processor. OOO subsystem 18 enables more than one u-op to be executed at the same time, although the u-ops may be executed in a different order than the order in which they were received by OOO subsystem 18.

Processor 4 may include a real register file (RRF) 20 for storing execution results of u-ops in the order in which the u-ops were received by OOO subsystem 18 (storing the execution result of a u-op in RRF 20 is called "retiring" the u-op). Execution results of u-ops may be stored temporarily in OOO subsystem 18 until such time as those results may be stored in RRF 20.

Processor 4 may include a register alias table and allocation unit (RAT/ALLOC) 22. RAT/ALLOC 22 may allocate temporary registers (not shown) of OOO subsystem 18 as the destinations of u-ops received from instruction decoder 16, to store the results of the u-ops until the results are retired. RAT/ALLOC 22 may also identify where the sources of u-ops received from instruction decoder 16 are, and may rename the sources as necessary. A u-op may include one or more operands and one or more "op-codes", where an op-code is a field of the u-op that defines the type of operation to be performed on some or all of the operands. RAT/ALLOC 22 may also assign for each op-code which of EU(s) 14 is to execute the op-code.

At each cycle of a clock 24, instruction decoder 16 may receive up to three macroinstructions from instruction cache memory 10 and may output one, two or three u-ops from previously received macroinstructions. At each cycle of clock 24, RAT/ALLOC 22 may receive at most three u-ops from instruction decoder 16 and may output to OOO subsystem 18 at most three allocated/renamed u-ops and their corresponding EU assignments. (In other embodiments, the limit of macroinstructions received by the instruction decoder per clock cycle from the instruction cache memory may be other than three. Similarly, in other embodiments, the limit of u-ops output by the instruction decoder per clock cycle may be other than three. In other embodiments, the limit of u-ops received by the RAT/ALLOC per clock cycle from the instruction decoder may be other than three. Similarly, in other embodiments, the limit of allocated/renamed u-ops and corresponding EU assignments output by the RAT/ALLOC per clock cycle to OOO subsystem 18 may be other than three.)

The Reservation Station

OOO subsystem 18 may include a reservation station 26 that, at each cycle of clock 24, may receive from RAT/ALLOC 22 and store internally the op-codes, the identification numbers and the EU assignments of at most three allocated/renamed u-ops. (In other embodiments, the limit of u-ops received by reservation station 26 per clock cycle may be other than three.) The operands for a u-op may be received by reservation station 26 at a different cycle of clock 24 than the cycle at which op-code(s), identification number and EU assignment(s) of that u-op are received. Reservation station 26 may receive an operand from instruction decoder 16 or, in the case of an operand that is an execution result of another u-op, from one of execution units 14 via a write-back (WB) bus 30.

Once all of the operands for a particular u-op have been received, the u-op is "valid for dispatching". Dispatch logic circuitry 262 of reservation station 26 may dispatch the particular u-op to the assigned one or more EUs via signals 32 only if certain resources are available. A non-exhaustive list of the resources reservation station 26 may check for availability includes the assigned EU(s), signals 32, and write-back bus 30. Reservation station 26 may check that the assigned one or more EUs are available to execute the one or more op-codes of the particular u-op, that signals 32 have the capacity to carry the op-codes, operands and identification numbers of the particular u-op, and that write-back bus 30 will be available to carry the execution results of the particular u-op once the results are calculated.

Reservation station 26 may store and handle more than one u-op at a time. The conditions for execution of one u-op may be fulfilled before the conditions for execution of a u-op that was received earlier. Consequently, u-ops may be dispatched and executed in an order that may be different from the order in which they were received by OOO subsystem 18.

"Fast" and "Slow" U-Ops

A u-op may be categorized as a "fast" or "slow" u-op, referring to the number of cycles of clock 24 that pass between the time an execution unit 14 receives a u-op from signals 32 and the time the same execution unit 14 outputs the execution result on write-back bus 30. Adding two integers is an example of a fast u-op, and an integer execution unit may require, for example, one, two, three, four or five cycles of clock 24 to execute the fast integer u-op. The number of cycles required to execute a fast u-op may depend upon the type of u-op.

Dividing a floating point number by another floating point number is an example of a slow u-op, and a floating point execution unit may require a constant but large number of cycles of clock 24 (for example, forty-three, forty-four or forty-five cycles) to execute the u-op. Fetching an operand from data cache memory 12 is another example of a slow u-op, and a load execution unit may require an unpredictable number of cycles of clock 24 to execute the u-op, since if there is a cache miss, the operand will need to be fetched from system memory 6 to data cache memory 12 before it is fetched to the load execution unit. An execution unit executing a slow u-op may send the identification number of the u-op on signals 34 several cycles of clock 24 before the execution unit sends the execution results of the u-op on write-back bus 30.

Setting the State of Operation of the Dispatch Logic Circuitry of the Reservation Station Dispatch logic circuitry 262 may have a performance state of operation, and a power-save state of operation that may consume less power than the performance state. Reservation station 26 may include control circuitry 264 to set the state of dispatch logic circuitry 262 via a signal 266 based upon the internal state of reservation station 26 and information received on signals 34 from EUs 14.

Figure 2:
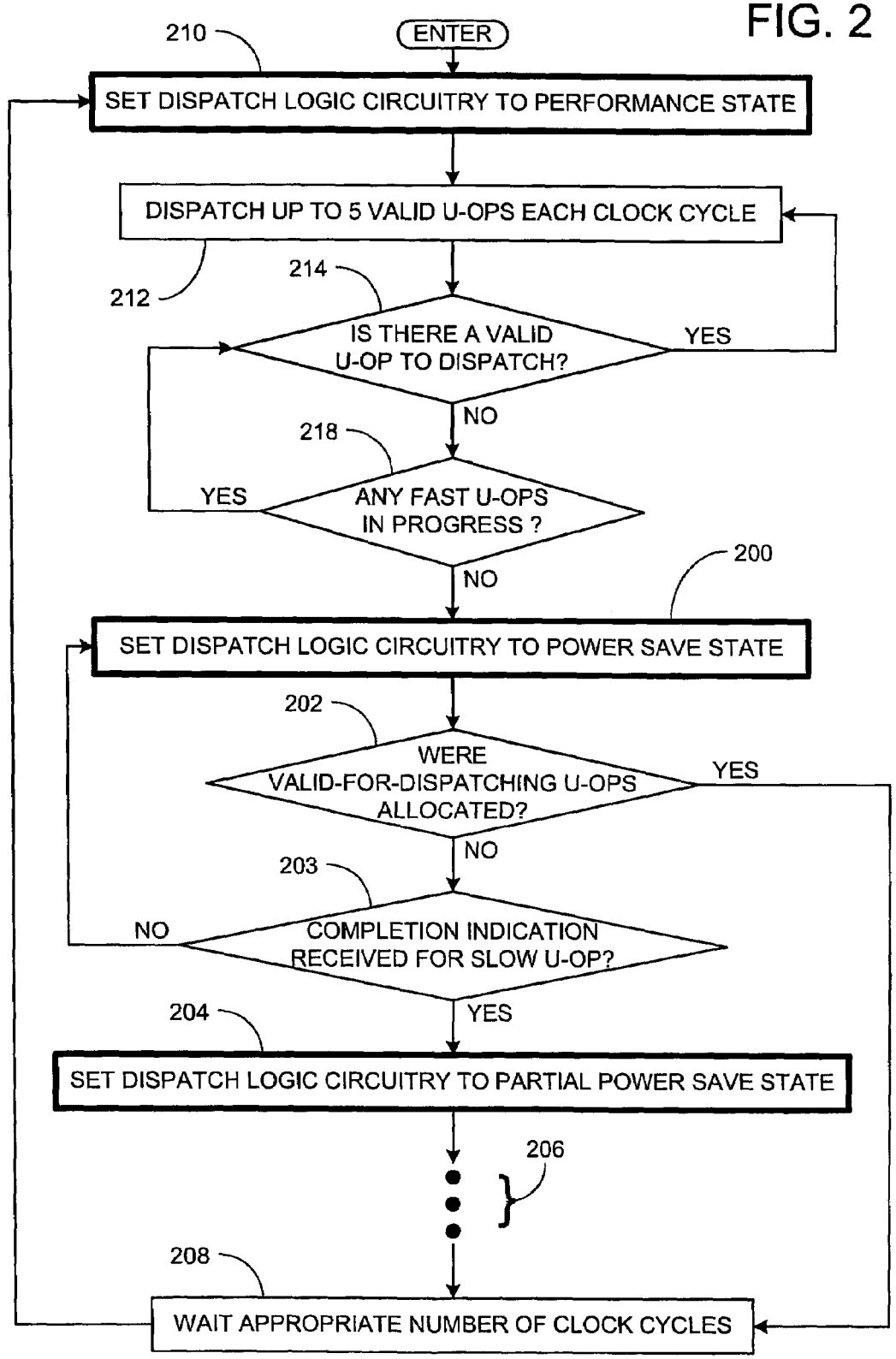
FIG. 2 is a flowchart illustration of an exemplary method for setting the state of operation of the dispatch logic circuitry of the reservation station, according to an embodiment of the invention.

FIG. 2 is a flowchart illustration of an exemplary method of setting the state of dispatch logic circuitry 262. When OOO subsystem 18 is powered up, control circuitry 264 may set dispatch logic circuitry 262 to performance state (-210-). When dispatch logic circuitry 262 is in performance state (-210-), it may dispatch up to five u-ops in each cycle of clock 24 to execution units 14, according to availability of op-codes, operands and resources (-212-). (In other embodiments, the limit of u-ops dispatched by dispatch logic circuitry 262 per clock cycle may be other than five.) If at least one of the u-ops stored by reservation station 26 is "valid for dispatching" (-214-), control circuitry 264 may keep dispatch logic circuitry 262 in performance state, and dispatch logic circuitry 262 may continue to dispatch u-ops to execution units 14.

If none of the u-ops stored by reservation station 26 is "valid for dispatching" (-214-), control circuitry 264 may check the status of fast u-ops that are currently being executed by execution units 14 (-218-).

If there are fast u-ops executed by execution units 14, control circuitry 264 may return to -214- to check whether there are any "valid for dispatching" u-ops. If there are no fast u-ops executed (-218-), control circuitry 264 may set dispatch logic circuitry 262 to power-save state (-200-).

Dispatch logic circuitry 262 remains in power-save state during the execution of slow u-ops, and remains in power-save state until a completion indication is received from a slow u-op by reservation station 26 (-202-), or until a "valid for dispatching" u-op is allocated. While dispatch logic circuitry 262 is in power-save state, reservation station 26 may store a u-op that is "valid for dispatching" on allocation, or a u-op that will become "valid for dispatching" once its operand, which is the execution result of a slow u-op, is received by reservation station 26. In the first case (-202-), dispatch logic circuitry 262 will exit power-save state after an appropriate number of clock cycles (-208-). In the latter case, dispatch logic circuitry 262 will remain in power-save state until the slow u-op has completed. Control circuitry 264 may receive the identification number of the slow u-op on signals 34 several cycles of clock 24 before the execution result of the slow u-op is sent on signals 30 (-203-). Therefore, in such a situation, control circuitry 264 may wait an appropriate number of cycles of clock 24 (-208-) and then may set dispatch logic circuitry 262 to performance state (-210-). The appropriate number of cycles to wait is such that no performance of dispatch logic circuitry 262 or reservation station 26 is lost compared to a situation in which there is no power-save state for dispatch logic circuitry 262.

Dispatch logic circuitry 262 may comprise sub-blocks (not shown) that may be powered separately. For example, once control circuitry 264 receives the identification number of a slow u-op on signals 34, control circuitry 264 may set dispatch logic circuitry 262 into a partial power-save state (-204-), in which one or more sub-blocks that were not powered in the power-save state are now powered. The sub-blocks receiving power in the partial power-save state of dispatch logic circuitry 262 may include, for example, a counter to enable waiting the appropriate number of cycles as above. FIG. 2 shows an ellipsis 206 to show that there may be other indications that control circuitry 264 is monitoring, and that when such other indications are identified by control circuitry 264, additional sub-blocks of dispatch logic circuitry 262 may be powered.

The exemplary method of FIG. 2 demonstrates that control circuitry 264 may set dispatch logic circuitry 262 to a power-save state if certain conditions are satisfied, the conditions ensuring that the performance of processor 4 will not be adversely affected during the transition into and recovery from power-save state. By reading the internal state of reservation station 26 (e.g. none of the u-ops stored by reservation station 26 are "valid for dispatching") and by monitoring incoming signals, control circuitry 264 may predict periods during which the activities of dispatch logic circuitry 262 (namely, dispatching u-ops) are futile and may set dispatch logic circuitry 262 to power-save state. Similarly, by monitoring incoming signals (e.g. the identification number of a slow u-op several cycles before the execution results are going to be sent, or the allocation of a u-op that is "valid for dispatching" upon allocation), control circuitry 264 may predict periods during which the activities of dispatch logic circuitry 262 are not futile, and may set dispatch logic circuitry 262 to performance state. The increase in power consumption of dispatch logic circuitry 262 from power-save state may be incremental.

The Reorder Buffer

Referring back to FIG. 1, OOO subsystem 18 may include a reorder buffer (ROB) 28 to temporarily store execution results until they are stored in real register file 20 in the order in which the u-ops were received by OOO subsystem 18. Reorder buffer 28 may receive execution results from execution units 14 on write-back bus 30, and the identification numbers of the corresponding u-ops on signals 34. Reorder buffer 28 may store internally the identification numbers and execution results until the u-ops are retired to real register file 20. For each u-op, reorder buffer 28 may receive the identification number on signals 34 several cycles of clock 24 before the execution results are received on write-back bus 30.

A particular u-op is "valid for retiring" if its execution results have been received by reorder buffer 28 and other conditions, if any, have been satisfied. A retire logic circuitry 282 of reorder buffer 28 may then retire the "valid for retiring" u-ops according to the original order of u-ops and store their execution results in real register file 20.

At each cycle of clock 24, retire logic circuitry 282 may retire at most three "valid for retiring" u-ops. (In other embodiments, the limit of u-ops retired by retire logic circuitry 282 per clock cycle may be other than three.) No u-ops will be retired until the u-op that is next to be retired according to the original order of u-ops is "valid for retiring". In such a situation, reorder buffer 28 may be able to save power without sacrificing performance.

Setting the State of Operation of the Retire Logic Circuitry of the Reorder Buffer Retire logic circuitry 282 may have a performance state of operation, and a power-save state of operation that may have a lower performance and consume less power than the performance state. Reorder buffer 28 may include control circuitry 284 to set the state of retire logic circuitry 282 via a signal 286 based upon the internal state of reorder buffer 28 and information received on signals 34 from EUs 14.

Figure 3:
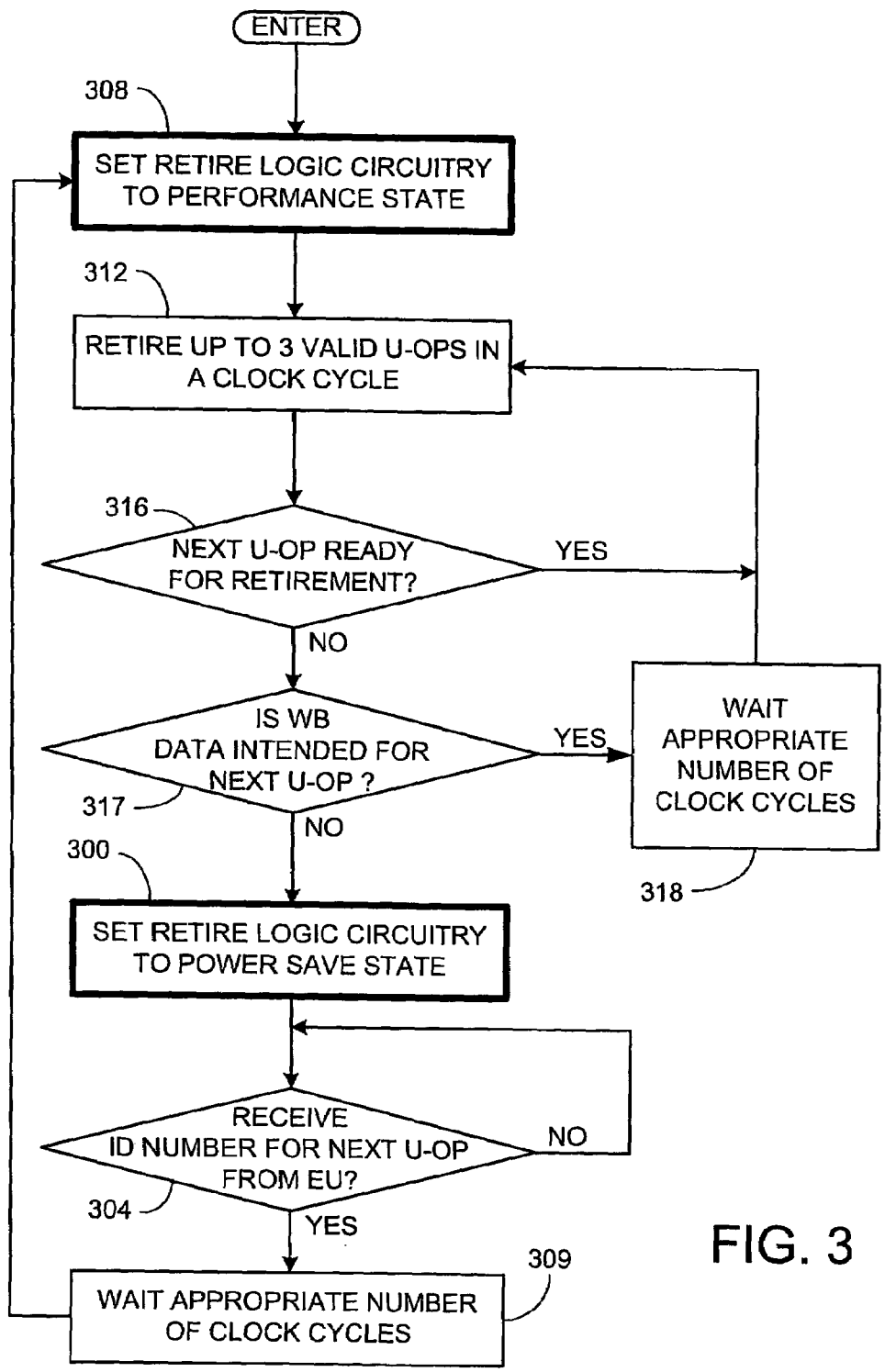
FIG. 3 is a flowchart illustration of an exemplary method for setting the state of operation of the retire logic circuitry of the reorder buffer, according to an embodiment of the invention.

FIG. 3 is a flowchart illustration of an exemplary method of setting the state of retire logic circuitry 282. When OOO subsystem 18 is powered up, control circuitry 284 may set retire logic circuitry 282 to performance state (-308-).

In performance state, retire logic circuitry 282 may retire up to three u-ops in each cycle of clock 24 to real register file 20, according to availability of execution results (-312-). (In other embodiments, the limit of u-ops retired by retire logic circuitry 282 per clock cycle to real register file 20 may be other than three.) If reorder buffer 28 stores at least one u-op, and if the next u-op to be retired according to the original order of u-ops is "valid for retiring" (-316-), control circuitry 284 may keep retire logic circuitry 282 in performance state, and retire logic circuitry 282 may continue to retire u-ops to real register file 20 (-312-).

If reorder buffer 28 stores at least one u-op, but the next u-op to be retired is not "valid for retiring" (-316-), control circuitry 284 may then check whether write-back (WB) bus 30 is carrying data intended for the next u-op to be retired (-317-). If so, then after waiting an appropriate number of cycles (-318-), the next u-op to be retired will become "valid for retiring" and retire logic circuitry 282 will retire one or more u-ops to real register file 20 (-312-). If not, then control circuitry 284 may set retire logic circuitry 282 to power-save state (-300-).

When retire logic circuitry 282 is in power-save state (-300-), at least one u-op is waiting to be retired. Therefore, control circuitry 284 may monitor signals 34 and may wait to receive an identification number that matches the identification number of the u-op that is next to be retired according to the original order of u-ops (-304-). When this identification number is received, reorder buffer 28 may wait the appropriate number of cycles of clock 24 (-309-), and may then set retire logic circuitry 282 to performance state (-308-).

The exemplary method of FIG. 3 demonstrates that control circuitry 284 may set retire logic circuitry 282 to a power-save state if certain conditions are satisfied, the conditions ensuring that the performance of processor 4 will not be adversely affected during the transition into and recovery from power-save state. By reading the internal state of reorder buffer 28 (e.g. that the next u-op to be retired is not "valid for retiring") and by monitoring incoming signals, control circuitry 284 may predict periods during which the activities of retire logic circuitry 282 (namely, retiring u-ops) are futile and may set retire logic circuitry 282 to power-save state. Similarly, by monitoring incoming signals (e.g. receiving the identification number of the next u-op to be retired before the execution results of that u-op are going to be sent), control circuitry 284 may predict periods during which the activities of retire logic circuitry 282 are not futile, and may set retire logic circuitry 282 to performance state. The increase in power consumption of retire logic circuitry 282 from power-save state may be incremental.

Figure 4:
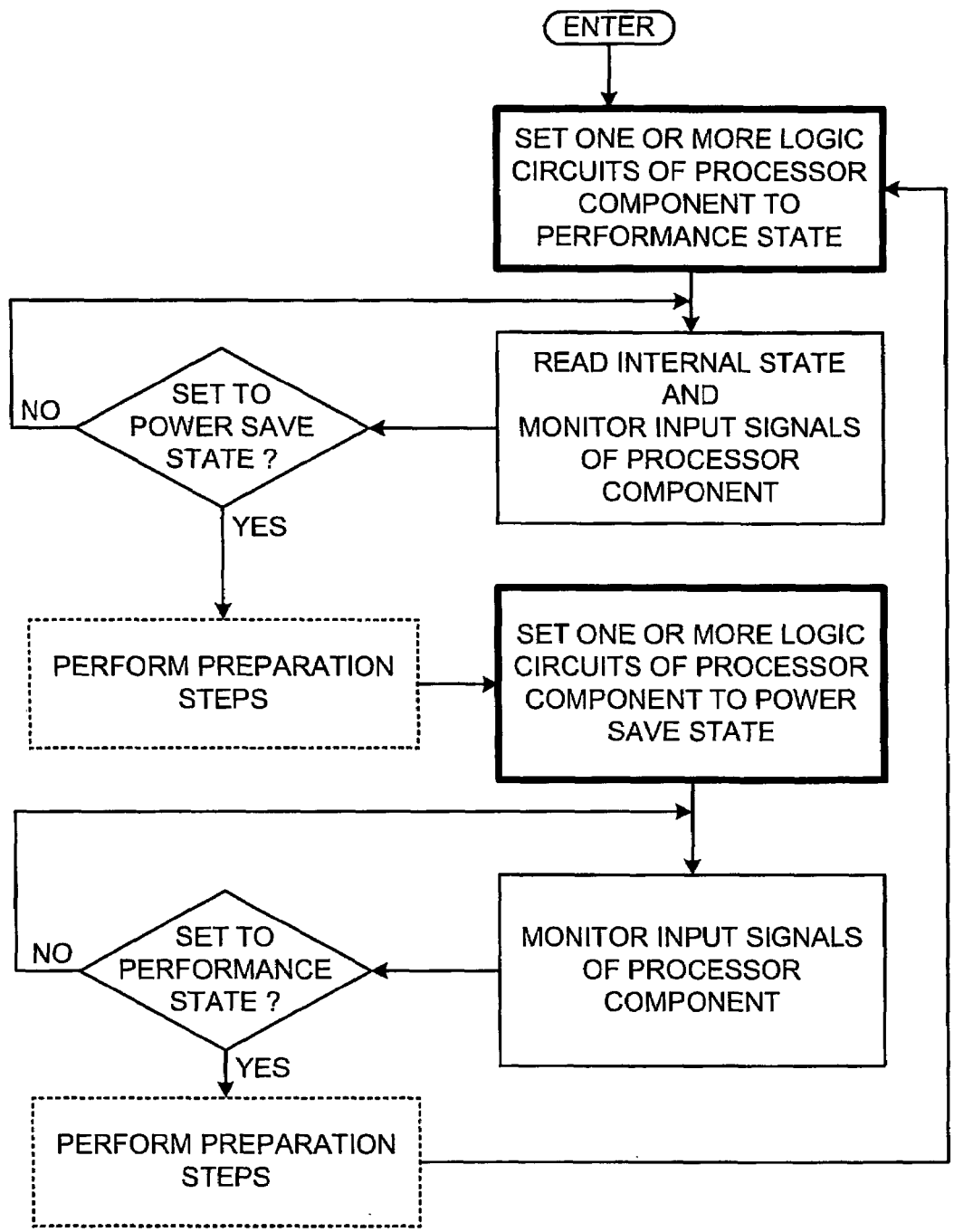
FIG. 4 is an illustration of an exemplary finite state machine, according to an embodiment of the invention.

Setting the State of Operation of One or More Logic Circuits of a Component of the Processor for which Periods of Futile Activity may be Predicted In more general terms, any component of processor 4 for which periods of futile activity may be predicted may be designed to include control circuitry to predict such periods and to put one or more logic circuits of the component into a power-save state of operation. The control circuitry may read the internal status of the processor component and monitor input signals to the processor component in order to determine when to put the one or more logic circuits of the component into power-save state. Once in power-save state, the control circuitry may monitor input signals to the processor component in order to determine when to recover to a performance state. A finite state machine such as the exemplary finite state machine shown in FIG. 4 may be implemented to ensure that the performance of the processor and the processor component are not adversely affected by putting one or more logic circuits of the processor component into power-save state.

It should be noted that the performance of a processor such as exemplary processor 4 is dependent upon a random sequence of macroinstructions received by the processor. Therefore the times at which a logic circuit of a processor component will have futile activity are also random.

Although the foregoing description uses the example of a processor, embodiments of the present invention are equally applicable to integrated circuits having other logic circuits, for example, bus controllers, timers, and other such peripherals. Embodiments of the present invention may be applied to any integrated circuit having a logic circuit that has idle states that may be predicted.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   when one or more logic circuits of a component of a processor are in a state of reduced power consumption, in which an internal, state of said component is not read:
      monitoring one or more signals received by said component, the signals including signals affecting said internal state; and
      predicting, based on said one or more signals, at what future time to increase the power consumption of one or more of said one or more logic circuits in order to read said affected internal state.

2. The method of claim 1, further comprising:
   continuing to monitor said one or more signals received by said component; and
   predicting, based on said one or more signals, at what time after said future time to increase the power consumption of additional logic circuits of said one or more logic circuits.

3. The method of claim 1, wherein said component is a reservation station, said one or more logic circuits include dispatch logic circuitry, and monitoring said one or more signals includes monitoring signals on a writeback bus from execution units of said processor to said reservation station, monitoring a signal on which an indication is sent that a micro-operation execution result will subsequently be sent on said writeback bus; and monitoring a signal regarding allocation of micro-operations.

4. The method of claim 1, wherein said component is a reorder buffer, said one or more logic circuits include retire logic circuitry, and monitoring said one or more signals includes monitoring a signal on which an indication is sent that a micro-operation execution result will subsequently be sent on a writeback bus from execution units of said processor to said reorder buffer.

5. A method comprising:
   alternating between a first power-consumption state, in which an internal state of a component of a processor is not read, and a second power-consumption state, in which said internal state is read, by:
      setting one or more logic circuits of said component to said first power-consumption state, based upon said internal state and external signals received by said component that affect said internal state; and
      based on an indication that a micro-operation execution result will subsequently be sent to said component, setting said one or more logic circuits to said second power-consumption state.

6. The method of claim 5, wherein said component is a reservation station, said one or more logic circuits include dispatch logic circuitry, said first power-consumption state is a reduced power consumption state, said second power-consumption state is a performance state, and said internal state includes an indication whether any micro-operations are valid for dispatching.

7. The method of claim 5, wherein said component is a reorder buffer, said one or more logic circuits include retire logic circuitry, said first power-consumption state is a reduced power consumption state, said second power-consumption state is a performance state, and said internal state includes an indication whether a micro-operation that is next to be retired is valid for retiring.

8. A method comprising:
   identifying, based on an internal state of a component of a processor, that the power consumption of, one or more logic circuits of said component can be reduced for more than one clock cycle, where said one or more logic circuits are currently in a state of full power consumption in which said internal state is read;
   reducing power consumption of said one or more logic circuits so that said internal state is not read;
   monitoring one or more signals received by said component that affect said internal state; and
   predicting, based on said one or more signals, at what future time beyond a next clock cycle to increase the power consumption of one or more of said one or more logic circuits so as to read said internal state.

9. The method of claim 8, wherein said component is a reservation station, said one or more logic circuits include dispatch logic circuitry, said internal state includes an indication whether any micro-operations are valid for dispatching, and monitoring said one or more signals includes monitoring whether fast micro-operations are currently being executed by execution units of said processor and monitoring a signal regarding allocation of micro-operations.

10. The method of claim 8, wherein said component is a reorder buffer, said one or more logic circuits include retire logic circuitry, said internal state includes an indication that a micro-operation that is next to be retired is not valid for retiring, and monitoring said one or more signals includes monitoring signals on a writeback bus from execution units of said processor to said reorder bus.

11. A method comprising:
based on external signals received by a component of a processor, the external signals affecting an internal state of said component, predicting whether at a particular future time beyond a next clock cycle activities of one or more logic circuits that read said internal state will be futile or not.

12. The method of claim 11, wherein if activities of said one or more logic circuits would not be futile at said particular future time, the method further comprises:
ensuring that said one or more logic circuits are in said performance state for said particular future time.

13. The method of claim 12, wherein ensuring that said one or more logic circuits are in said performance state for said particular future time includes setting said one or more logic circuits to said performance state for said particular future time.

14. The method of claim 11, wherein if activities of said one or more logic circuits would be futile at said particular future time, the method further comprises:
ensuring that said one or more logic circuits are in a power-save state for said particular future time.

15. The method of claim 14, wherein ensuring that said one or more logic circuits are in said power-save state for said particular future time includes setting said one or more logic circuits to said power-save state for said particular future time.

16. A processor comprising:
a processor component including at least:
logic circuitry having a reduced power state in which an internal state of said processor component is not read, and a full power state in which said internal state is read; and
control circuitry coupled to one or more logic circuits of said logic circuitry, wherein said control circuitry is able to monitor external signals received by said processor component and, when said logic circuitry is in said reduced power state, to predict based on said external signals at what future time beyond a next clock cycle to increase the power consumption of said one or more logic circuits so as to read said internal state.

17. The processor of claim 16, wherein said processor component is a reservation station and said one or more logic circuits include dispatch logic circuitry.

18. The processor of claim 16, wherein said processor component is a reorder buffer and said one or more logic circuits include retire logic circuitry.

19. An apparatus comprising:
a voltage monitor; and
a processor component including at least:
logic circuitry having a reduced power state in which an internal state of said processor component is not ready and a full power state in which said internal state is read; and
control circuitry coupled to one or more logic circuits of said logic circuitry, wherein said control circuitry is able to monitor external signals received by said processor component and, when said logic circuitry is in said reduced power state, to predict based on said external signals at what future time beyond a next clock cycle to increase the power consumption of said one or more logic circuits so as to read said internal state.

20. The apparatus of claim 19, wherein said processor component is a reservation station and said one or more logic circuits include dispatch logic circuitry.

21. The apparatus of claim 19, wherein said processor component is a reorder buffer and said one or more logic circuits include retire logic circuitry.

* * * * *